US009635551B2

(12) United States Patent
Sadler et al.

(10) Patent No.: US 9,635,551 B2
(45) Date of Patent: *Apr. 25, 2017

(54) SYSTEM AND METHOD FOR CONTROLLING ACCESS TO A FUNCTION PERFORMED BY A WIRELESS DEVICE

(71) Applicant: GOOGLE TECHNOLOGY HOLDINGS LLC, Mountain View, CA (US)

(72) Inventors: Daniel J. Sadler, Queen Creek, AZ (US); Manuel Oliver, McLean, VA (US); Morris Anthony Moore, Bee Cave, TX (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,867

(22) Filed: Oct. 29, 2014

(65) Prior Publication Data

US 2015/0052583 A1    Feb. 19, 2015

Related U.S. Application Data

(63) Continuation of application No. 11/866,936, filed on Oct. 3, 2007, now Pat. No. 8,893,284.

(51) Int. Cl.
*H04L 29/06* (2006.01)
*H04W 12/06* (2009.01)
(Continued)

(52) U.S. Cl.
CPC .......... *H04W 12/06* (2013.01); *G06F 21/32* (2013.01); *G06F 21/34* (2013.01); *G06F 21/35* (2013.01);
(Continued)

(58) Field of Classification Search
CPC ...................................................... H04W 12/06
See application file for complete search history.

(56) References Cited

U.S. PATENT DOCUMENTS 5,656,996 A * 8/1997 Houser ............. G08B 13/1454
340/539.1
6,189,105 B1 * 2/2001 Lopes ............................ 726/20
(Continued)

FOREIGN PATENT DOCUMENTS

EP     1634782 A2    3/2006
EP     1843274 A2 * 10/2007
(Continued)

OTHER PUBLICATIONS

Extended European Search Report for corresponding European Application No. 08 036 020.1; Nov. 20, 2012.
(Continued)

*Primary Examiner* — Shawnchoy Rahman
(74) *Attorney, Agent, or Firm* — Morris & Kamlay LLP

(57) ABSTRACT

A method and system for extending an authentication of a wireless device are disclosed. For example, the method includes authenticating access to the wireless device via a first authentication. The method detects a bonded authentication device as a second authentication. The method permits access to the wireless device when the bonded authentication device is detected.

18 Claims, 4 Drawing Sheets

(51) Int. Cl.
*G06F 21/32* (2013.01)
*G06F 21/34* (2013.01)
*G06F 21/35* (2013.01)
*H04W 88/02* (2009.01)

(52) U.S. Cl.
CPC .......... *H04L 63/08* (2013.01); *H04L 63/0853* (2013.01); *H04L 63/0492* (2013.01); *H04W 88/02* (2013.01)

(56) References Cited

U.S. PATENT DOCUMENTS

| | | | |
|---|---|---|---|
| 7,084,734 | B2 | 8/2006 | Singh |
| 7,174,454 | B2 * | 2/2007 | Roskind ................ G06F 21/316 705/66 |
| 2003/0093693 | A1 | 5/2003 | Blight et al. |
| 2005/0105734 | A1 | 5/2005 | Buer et al. |
| 2005/0151623 | A1 | 7/2005 | Von Hoffmann |
| 2005/0221798 | A1 | 10/2005 | Sengupta et al. |
| 2005/0278776 | A1 | 12/2005 | Kitagawa et al. |
| 2006/0128305 | A1 | 6/2006 | Delalat |
| 2006/0154649 | A1 | 7/2006 | Pedersen et al. |
| 2007/0297609 | A1 | 12/2007 | Adams et al. |
| 2008/0028230 | A1 * | 1/2008 | Shatford ...................... 713/186 |
| 2008/0289030 | A1 * | 11/2008 | Poplett ........................ 726/15 |

FOREIGN PATENT DOCUMENTS

| | | | |
|---|---|---|---|
| JP | 2004341600 | A * | 12/2004 |
| WO | 2004070591 | A1 | 8/2004 |
| WO | 2004109481 | A1 | 12/2004 |

OTHER PUBLICATIONS

Office Action, Korean App. No. 10-2010-7009619 (Foreign Text and English Translation), Sep. 19, 2011.

Varshaysky, A. et al., "Amigo: Proximity-Based Authentication of Mobile Devices," J. Krumm et al. (Eds.): UbiComp 2007, LCNS 4717, pp. 253-270, Springer-Verlag Berlin Heidelberg (2007).

International Preliminary Report on Patentability dated Apr. 7, 2010 as received in Application No. PCT/US2008/077430.

Office Action dated Jul. 1, 2014 as received in EP Application No. 08836020.1.

Office Action dated Jun. 13, 2002 as received in CA Application No. 2,701,676.

Office Action dated Jun. 27, 2016 as received in EP Application No. 08836020.1.

* cited by examiner

SYSTEM AND METHOD FOR CONTROLLING ACCESS TO A FUNCTION PERFORMED BY A WIRELESS DEVICE

CROSS-REFERENCE TO RELATED APPLICATIONS

This application is a continuation of U.S. application Ser. No. 11/866,936, filed Oct. 3, 2007, the disclosure of which is incorporated by reference in its entirety.

FIELD OF THE INVENTION

The present invention relates generally to security for wireless devices and, in particular, extending authentication of a wireless device.

BACKGROUND OF THE INVENTION

The increased capabilities of wireless devices today have led to the ability to perform various transactions using wireless devices. For example, a user of a wireless device may now download content, make online purchases, access account information and the like. However, these advances have also led to increased concern for security related to performing these transactions.

Currently, security on wireless devices is limited to an initial authentication and repeated subsequent authentications. A user may lock the wireless device with a password or biometric reading to ensure that only an authorized user may access the wireless device. Once the wireless device is accessed by the user, the wireless device may require re-authentication after a certain time period or for every transaction executed via the wireless device. Thus, an authorized user may be required to repeatedly re-enter the password for authentication. This can become burdensome and inefficient to the user.

SUMMARY OF THE INVENTION

In one embodiment, the present invention discloses a method, apparatus and computer readable medium for extending an authentication of a wireless device. For example, the method comprises authenticating access to said wireless device via a first authentication. The method detects a bonded authentication device as a second authentication. The method permits access to said wireless device when said bonded authentication device is detected.

In another illustrative embodiment, the present invention discloses a computer readable medium having stored thereon a plurality of instructions, the plurality of instructions including instructions which, when executed by a processor, cause the processor to perform the steps of a method for extending an authentication of a wireless device. When executed, the method comprises authenticating access to said wireless device via a first authentication, detecting a bonded authentication device as a second authentication and permitting access to said wireless device when said bonded authentication device is detected.

In another illustrative embodiment, the present invention discloses an apparatus for extending an authentication of a wireless device. For example, the apparatus comprises a processor for authenticating access to said wireless device via a first authentication, detecting a bonded authentication device as a second authentication and permitting access to said wireless device when said bonded authentication device is detected.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
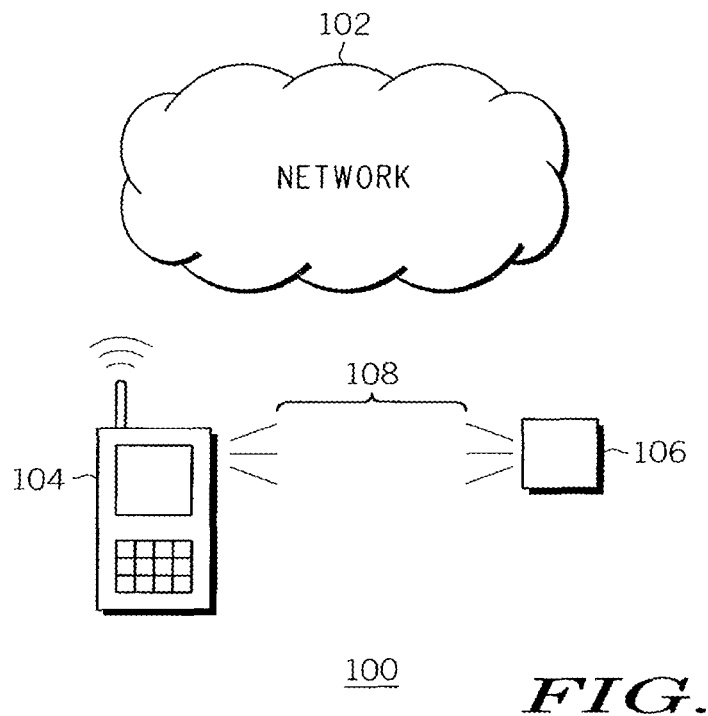
FIG. 1 illustrates a high level block diagram of an illustrative network architecture of the present invention.

FIG. 1 illustrates a high level block diagram of an illustrative network architecture 100 of the present invention. In one embodiment, network architecture 100 includes a network 102, a wireless device 104 and an accessory device 106. The network 102 may be for example, any wireless or cellular network that is capable of communicating with the wireless device 104. It should be noted that the present invention is not limited to any specific type of network.

In one embodiment, wireless device 104 may be any wireless device capable of communicating with network 102. For example, the wireless device 104 may be a cellular telephone, a personal digital assistant (PDA), a PDA telephone, a pager, a laptop computer, a text messaging device and the like.

In one embodiment, the accessory device 106 may be any accessory device that is capable of communicating with the wireless device 104. In addition, the accessory device 106 may be a wearable device, e.g. worn by a user. For example, the accessory device 106 may be a head set, a wrist watch, a wrist band, a smart card or any other accessory device that is capable of communicating with wireless device 104. In an exemplary embodiment, the accessory device 106 may communicate with the wireless device 104 via a short range wireless communication protocol 108. For example, the short range wireless communication protocol 108 may be the BLUETOOTH® protocol of Bluetooth Special Interest Group of Bellevue, Wash. or similar protocol. Notably, the accessory device 106 does not necessarily need to be a new device created specifically for use with the wireless device 104. Rather, the accessory device 106 may be any device currently on the market or any device that may be released in the future.

Figure 2:
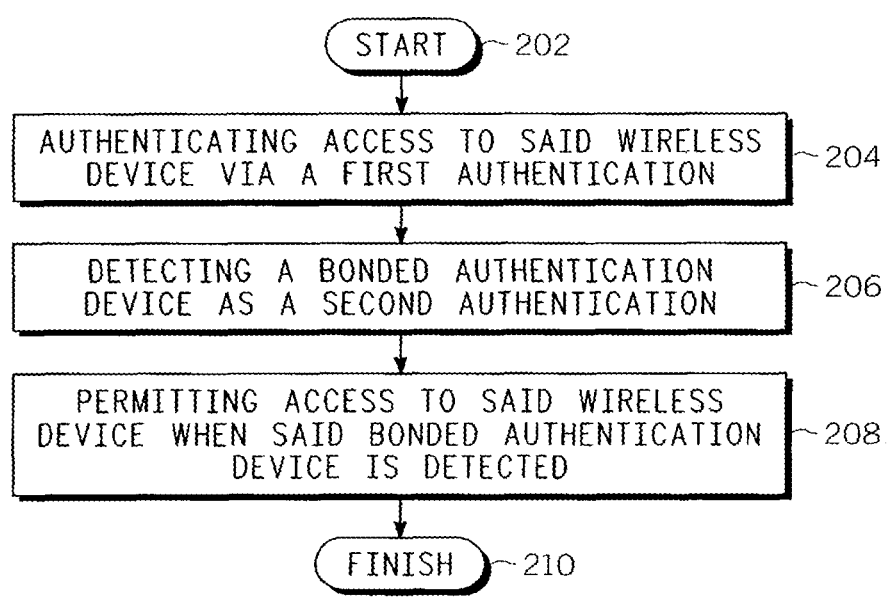
FIG. 2 illustrates an illustrative flow diagram depicting a method for extending an authentication to a wireless device.

FIG. 2 depicts an illustrative flow diagram depicting a method 200 for extending an authentication to a wireless device. The method 200 starts at step 202.

At step 204 a user may be authenticated via a first authentication. The first authentication may be for example, a user password, a personal identification number, a biometric reading and the like. For example, a user may use the user interface (e.g. a keypad, biometric sensors) on the wireless device 104 to provide the necessary first authentication.

Then at step 206, a bonded authentication device (also referred to herein as simply an "AD") is detected as a second authentication. Broadly, the presence of an authentication bonded accessory device 106 serving as a bonded authentication device can be used as a second authentication. As will be discussed in further detail with reference to FIGS. 3A and 3B, any accessory device 106 may function as an authentication device. Furthermore, how a device is authentication bonded to the wireless device 104 will also be discussed in further detail with reference to FIGS. 3A and 3B.

The method proceeds to step 208 where access to the wireless device 104 is permitted when the bonded authentication device is detected. For example, if a user wants to access his emails via the wireless device 104, then the detection of the bonded authentication device will allow the user to immediately access the email without having to provide the necessary first authentication again to the wireless device 104. As will be discussed with reference to FIGS. 3A and 3B, when the bonded authentication device is detected, the wireless device 104 may enter an enhanced security mode. The enhanced security mode may provide greater access to the wireless device 104 than when the wireless device 104 is in an unauthenticated mode or a user authenticated normal mode. Furthermore, the enhanced security mode may extend an amount of time of the access compared to when the wireless device 104 is in an unauthenticated mode or a user authenticated normal mode. The unauthenticated mode may be for example, where certain features of the wireless device 104 may be locked to prevent unauthorized access. For example, certain transactional features of the wireless device 104 may be disabled, an internet browser on the wireless device 104 may be disabled, certain software applications may be disabled, an address book may be disabled, an email application may be disabled or certain calling features may be disabled or any combination thereof.

The normal mode may be a security mode where a user is required to repeatedly provide the first authentication. For example, a user may be required to provide the first authentication every time the user wishes to conduct a transaction via the wireless device 104. Alternatively, the normal mode may be for example, where a user is required to provide the first authentication if the wireless device 104 remains idle for a pre-determined period of time (e.g. every 30 minutes, every hour and so on).

As a result, providing greater access in the enhanced security mode may allow a user to access previously locked or disabled features of the wireless device 104. Alternatively, providing greater access in the enhanced security mode may be such that the wireless device 104 may be deemed to be secure without repeatedly requiring the first authentication. In other words, the amount of time the access is permitted to the wireless device 104 is extended when compared to the amount of time access is permitted when the wireless device 104 is in the user authenticated normal mode. For example, a user of the wireless device 104 may not be required to repeatedly provide the first authentication even if the wireless device 104 remains idle for a period of time. Alternatively, a user of the wireless device 104 may not be required to repeatedly provide the first authentication every time the user attempts to execute a transaction using the wireless device 104. The method concludes at step 210.

Figure 3A:
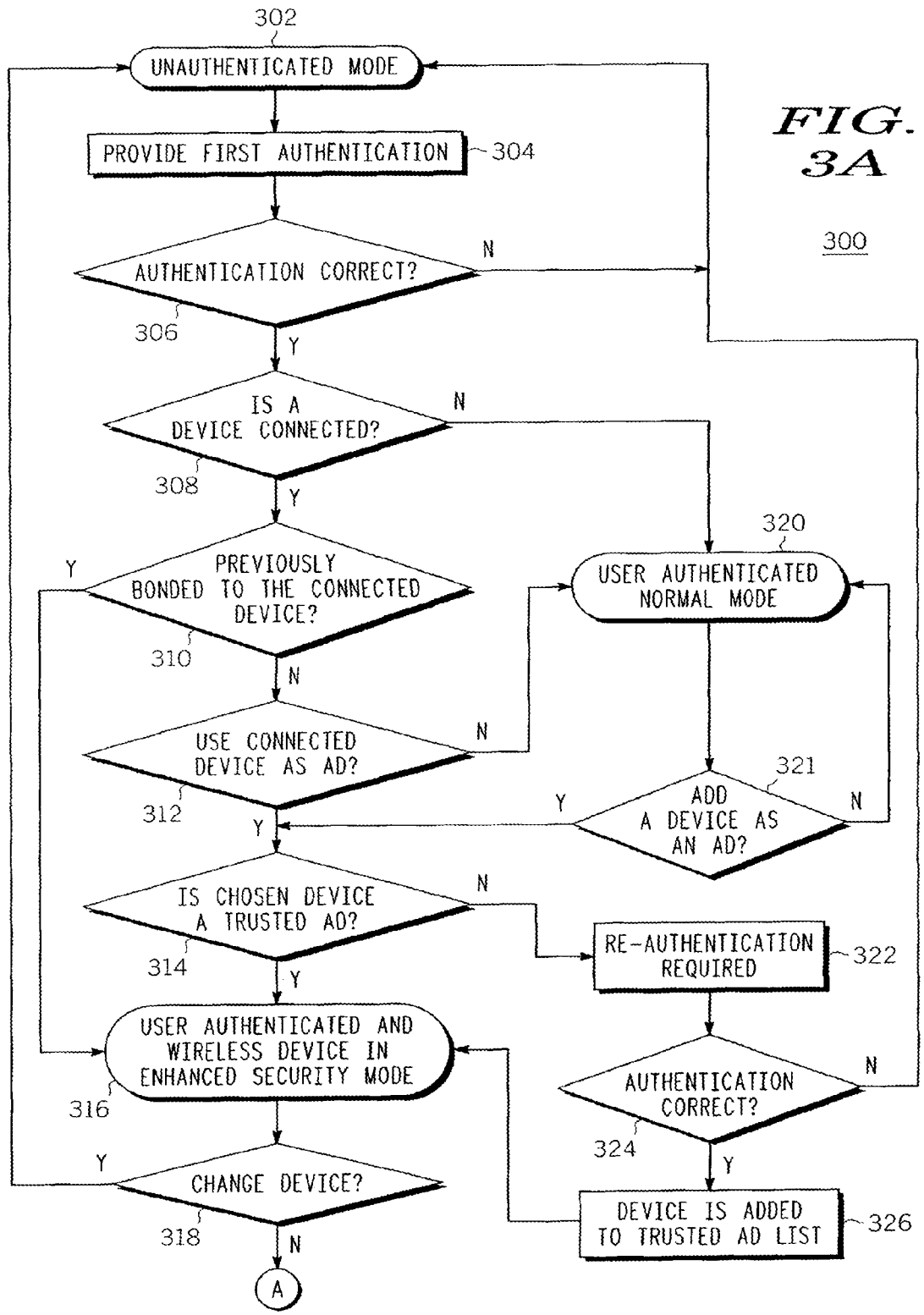
FIG. 3A illustrates a more detailed illustrative flow diagram depicting a method for extending an authentication to a wireless device.
Figure 3B:
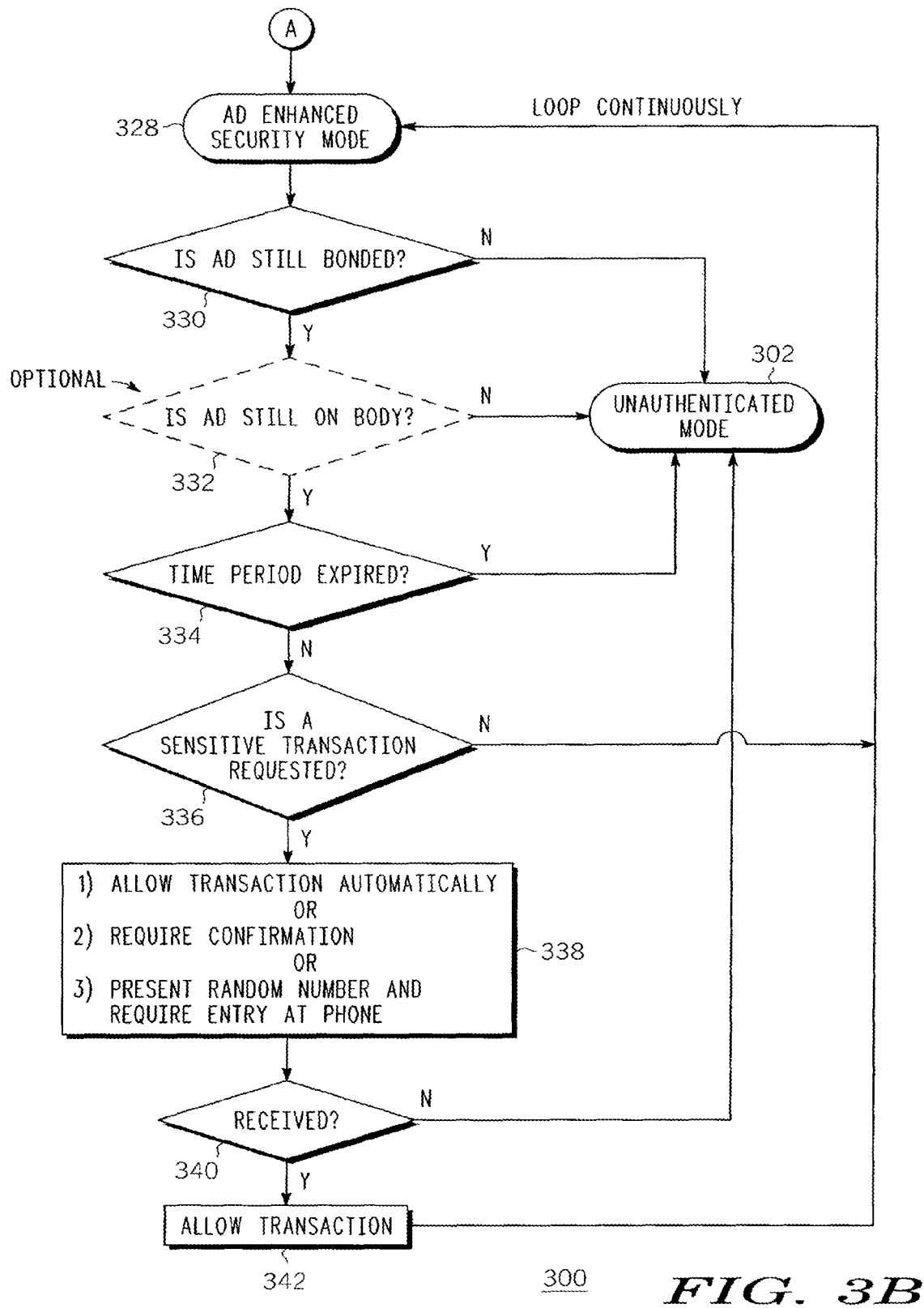
FIG. 3B illustrates a more detailed illustrative flow diagram depicting a method for extending an authentication to a wireless device.

FIGS. 3A and 3B depict more detailed illustrative flow diagrams depicting a method 300 for extending an authentication to a wireless device. Method 300 begins at step 302 where a user accesses a wireless device 104 in the unauthenticated mode.

Method 300 proceeds to step 304 where a first authentication is provided. As discussed above with reference to FIG. 2, the first authentication may be, for example, a user password, a personal identification number, a biometric reading and the like. For example, the user provides the necessary first authentication to the wireless device 104 via a user interface (e.g. a keypad, a microphone, a biometric sensor and the like).

At step 306, a decision is made to determine whether the provided authentication is correct. For example, a user may initialize the wireless device 104 with a user selected password, a personal identification or an initial biometric reading. As a result, the provided first authentication must be correct regardless of what authentication method is used to gain access to the wireless device 104 by the user. If the provided first authentication is incorrect, the method proceeds back to step 302 where the wireless device 104 remains in an unauthenticated mode. However, if the authentication is correct, then the method proceeds to step 308.

At step 308 a decision is made to determine if an accessory device 106 is connected. As discussed above, in one embodiment the accessory device 106 may be any device that is capable of communicating with the wireless device 104. Furthermore, the accessory device 106 may be a wearable device. For example, the accessory device 106 may be a head set, a wrist watch, a wrist band and the like. The accessory device 106 may be connected to the wireless device 104 using any short range wireless communication protocol 108, such as for example, BLUETOOTH® protocol. If an accessory device 106 is not detected at step 308, then the method may proceed to step 320 where the wireless device 104 may enter the user authenticated normal mode.

However, if an accessory device 106 is connected to the wireless device 104, then the method 300 may proceed to step 310. At step 310, a decision is made to determine whether the wireless device 104 was previously authentication bonded to the connected device as an authentication device, e.g. an accessory device 106. As discussed below with reference to step 318, a user may desire to change authentication devices for various reasons. As a result, if the wireless device 104 was previously authentication bonded to an authentication device and the provided first authentication is correct, then the wireless device 104 may go directly to step 316 where the wireless device 104 enters into an enhanced security mode.

Enhanced security mode provides extended authentication for the user of the wireless device 104. For example, in contrast to the normal mode discussed above with reference to step 320, in enhanced security mode a user is not required to repeatedly provide the first authentication for every transaction made via the wireless device 104 or if the wireless device 104 remains idle. The detected accessory device 106 becomes a bonded authentication device serving as a second authentication.

If the wireless device 104 was not previously authentication bonded to the connected device as an authentication device, then the method 300 may proceed to step 312. At step 312, a decision is made as to whether the user wishes to use the connected accessory device 106 as a bonded authentication device. If the user does not wish to use the connected accessory device 106 as a bonded authentication device, then the method 300 proceeds to step 320 where the wireless device 104 enters a user authenticated normal mode of operation.

From the user authenticated normal mode at step 320, a decision to add an accessory device 106 as a bonded authentication device may be made at step 321. If a user does not wish to add an accessory device 106 as a bonded authentication device, then the method 300 may loop back to step 320 where the wireless device 104 remains in the user authenticated normal mode. However, if a user chooses to add an accessory device 106 as a bonded authentication device, then the method 300 may proceed to step 314.

Referring back to step 312, if the user chooses to use the connected accessory device 106 as a bonded authentication device, then the method 300 proceeds to a series of steps to authentication bond the chosen accessory device 106 as a bonded authentication device to the wireless device 104. In order for the chosen accessory device 106 to be authentication bonded, the chosen accessory device 106 must be a trusted authentication device. From either step 312 or step 321, a decision is made as to whether the chosen accessory device 106 is a trusted authentication device at step 314. If the chosen accessory device 106 is not a trusted authentication device, then the method 300 proceeds to step 322 to authenticate the accessory device 106 as a trusted authentication device.

Step 322 may provide a way for preventing an unauthorized person from using a non-trusted accessory device 106 to connect to the wireless device 104. In other words, step 322 ensures that only the accessory device(s) 106 owned by an authorized user of wireless device 104 is able to be used as a bonded authentication device for the wireless device 104.

From step 322, the method 300 proceeds to step 324 where a decision is made as to whether the authentication for the chosen accessory device 106 is correct. In one embodiment, to authenticate the chosen accessory device 106 a user may be required to re-enter the first authentication.

If the authentication is incorrect at step 324, the method 300 may proceed to step 302 where the wireless device enters into the unauthenticated mode at step 302. As a result, a user may be required to provide the first authentication again. In an exemplary embodiment, failing to authenticate at step 324 assumes that a non-trusted accessory device 106 is attempting to connect to the wireless device 104 as a bonded authentication device and, therefore, the wireless device 104 is likely to be in the hands of an unauthorized user.

If the authentication is correct at step 324, then the method proceeds to step 326 where the chosen accessory device 106 is added to a trusted authentication device list. Consequently, the chosen accessory device 106 may now be used as a bonded authentication device to authentication bond to the wireless device 104 as a second authentication. Then the method 300 proceeds from step 326 to step 316 where the wireless device 104 enters into the enhanced security mode.

Going back to step 314, if the chosen accessory device 106 is determined to already be a trusted authentication device, then method 300 may proceed to step 316 where the wireless device 104 enters into the enhanced security mode. For example, the chosen accessory device 106 may have been previously used as a bonded authentication device for wireless device 104 and the authentication process for the chosen accessory device 106 may have been previously executed. Therefore, the chosen accessory device 106 may already be on the trusted authentication device list.

Consequently, at step 316 the wireless device 104 may be in the enhanced security mode where it is authentication bonded to a trusted authentication device. In one embodiment, authentication bonded may be defined in the present invention as having an on-going session or continuity of communication between the accessory device 106 and the wireless device 104. For example, the on-going session may be via the short range wireless communication protocol 108.

Furthermore, the on-going session between the accessory device 106 and the wireless device 104 may be present even when both the accessory device 106 and the wireless device 104 remain idle. For example, even when idle, the wireless device 104 may ping the bonded authentication device continuously or at regular time intervals, such as for example every second, five seconds, 10 seconds and the like. However, one skilled in the art will recognize that the regular time interval may be any amount of time.

Once the on-going session is lost for any reason, for example, either due to loss of power of the accessory device 106 or moving either the wireless device 104 or the accessory device 106 outside of the operable range of the short range wireless communication protocol 108, the authentication bond may be considered to be broken. As a result, wireless device 104 may be considered to have no bonded authentication device. This condition may disrupt the enhanced security mode and cause the wireless device 104 to revert back to the unauthenticated mode at step 302, as discussed below with reference to FIG. 3B.

While the wireless device 104 is in the enhanced security mode at step 316, the user may desire to select a different accessory device 106 to serve as the bonded authentication device for the wireless device 104 for various reasons. For example, the currently bonded authentication device may be running low on battery or the user may desire to use a more fashionable wrist watch rather than a visible headset. Regardless of the reason, at step 318 a decision is made as to whether or not a user desires to select another accessory device 106 to authentication bond to the wireless device 104 as the bonded authentication device. If the user desires to change the bonded authentication device, then the method 300 proceeds back to step 302 and the wireless device 104 enters the unauthenticated mode. From step 302 the user is again required to provide the first authentication at step 304. Subsequently, if the authentication is determined to be correct at step 306 and an accessory device 106 is determined to be connected at step 308, the method may proceed directly back to enhanced security mode at step 316 from step 310.

If the user does not desire to change the bonded authentication device at step 318, then method 300 may proceed to step 328 of FIG. 3B where the wireless device 104 stays in the enhanced security mode.

Now referring to step FIG. 3B, the method 300 continues and overlaps with FIG. 3A at the node labeled "A". At step 328, the wireless device 104 is in the enhanced security mode. The method proceeds to step 330 where a decision is made as to whether the authentication device is still authentication bonded to the wireless device 104. If the authentication device is no longer authentication bonded to the wireless device 104, then the method 300 proceeds to step 302 where the authentication bond is assumed to be broken and the wireless device 104 enters the unauthenticated mode, as described above. However, if the authentication device is still authentication bonded to the wireless device 104, then the method 300 may proceed to an optional step 332. In one embodiment, the authentication bond between the wireless device 104 and the authentication bonded device may be checked by pinging as described above.

At step 332, a decision is made as to whether the authentication device is still on a user's body. In an exemplary embodiment of the present invention, the accessory device 106 chosen to serve as the bonded authentication device may have biometric sensors that indicate when it is on a user's body. For example, the accessory device 106 may have a temperature sensor that can sense a change in temperature from the user's body temperature to an ambient air temperature. In another embodiment, the accessory device 106 may have a resistor that can recognize the change in resistance from the user's skin to the resistance of air.

This provides an additional layer of security for extending authentication of a wireless device 104. To illustrate, if the accessory device 106 chosen to serve as the bonded authentication device is detected to be removed from the user's body, then the accessory device 106 may power down, thereby breaking the authentication bond to the wireless device 104. Alternatively, if the accessory device 106 chosen to serve as the bonded authentication device is detected to be removed from the user's body, then the accessory device 106 may send a session termination message to the wireless device 104 to break the authentication bond to the wireless device 104. Consequently at step 332, if the authentication device is determined to not be on the user's body, then the method 300 may proceed to step 302 where the wireless device 104 enters the unauthenticated mode. However, if the authentication device is determined to still be on the user's body, then method 300 may proceed to step 334.

Either directly from step 330 or from optional step 332, the method 300 determines if a pre-defined time period has expired at step 334. In one embodiment, a user may be required to provide the first authentication after a pre-defined time period. For example, a user may be required to provide the first authentication every 24 hours. However, the pre-defined time period may be any time period and the present invention is not limited by this example. This ensures that an unauthorized user does not have unlimited access to the wireless device 104 if somehow the unauthorized user obtains both the wireless device 104 and the accessory device 106 serving as the bonded authentication device.

At step 334, if it is determined that the pre-defined time period has expired, then the method 300 proceeds to step 302 where the wireless device 104 enters the unauthenticated mode. If it is determined that the pre-defined time period has not expired, then the method 300 may proceed to 336.

At step 336, a decision is made as to whether a sensitive transaction is required. For example, a transaction may be detected by certain actions on the wireless device 104 via an internet browser or using near field communications (NFC) at a super market, gas station, retail store and the like, where the wireless device 104 may be used as a credit card or a credit approving device.

In one embodiment, the sensitivity may be set by a user. For example, a user may set security levels for transactions of different user defined sensitivity levels. To illustrate, a user may decide that any purchase under ten dollars is not considered a sensitive transaction. Thus, if the wireless device 104 is in the enhanced security mode, the transaction may be executed without further authentication. Then the method 300 may proceed to step 328 where the wireless device 104 remains in the enhanced security mode. One skilled in the art will recognize that present invention is not limited by the examples used herein. For example, the levels for sensitivity may be based on any amount of money or information. Alternatively, the sensitivity level may be even automatically set by a service provider of the product or information.

However, if the transaction is considered to be sensitive, then the method 300 may proceed to step 338. At step 338, the sensitive transaction may be executed in accordance with the user's settings. For example, a user may still wish to execute a sensitive transaction automatically without any further authentication. In another embodiment, a user may be required to enter some sort of confirmation, such as for example, a password or a personal identification number (PIN). In yet another embodiment, the user may be required to provide a random number that is pre-issued to the user to execute the transaction or simply press a button on the wireless device 104 or the accessory device 106 to confirm the transaction.

Whatever the user's setting for dealing with a sensitive transaction at step 338, the method 300 proceeds to step 340 to determine if the desired authentication was received if necessary (e.g. if the user desires to allow a sensitive transaction automatically, then a confirmation may not be necessary and, thus not received). If the desired authentication was necessary and not received, then the method 300 may proceed to step 302 where the wireless device 104 enters the unauthenticated mode. However, if the desired authentication was received or unnecessary, then the method proceeds to step 342 where the sensitive transaction is allowed to proceed. Subsequently, the method 300 proceeds from step 342 to step 328 where the wireless device 104 remains in the enhanced security mode. Notably, the path from step 342 to step 328 and the path from step 336 to 328 may be looped continuously.

It should be noted that although not specifically specified, one or more steps of method 200 and 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2, 3A and 3B that recite a determining operation or involve a decision, do not necessarily require that both branches of the determining operation be practiced. In other words, one of the branches of the determining operation can be deemed as an optional step.

Thus, the present invention provides a method and system for extending authentication of a wireless device 104. As a result, a wireless device may be used more efficiently because an authentication is not required every time the wireless device remains idle for a certain period of time or for every transaction executed on the wireless device. Moreover, the present invention provides a more efficient use of the wireless device 104 without sacrificing security. For example, even if the wireless device is stolen or misplaced, the wireless device will automatically enter an unauthenticated mode as soon as the bonded authentication device is no longer detected. Therefore, the present invention provides extended authentication without sacrificing security.

Figure 4:
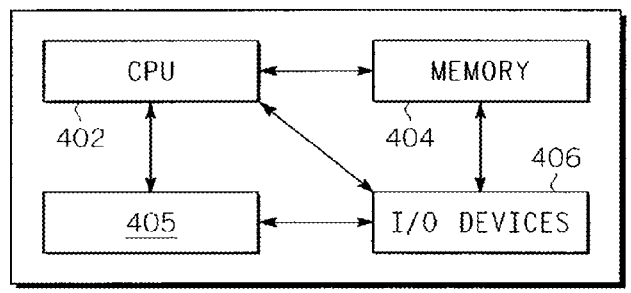
FIG. 4 illustrates a high level block diagram of an illustrative general purpose computer suitable for use in performing the functions described herein.

FIG. 4 illustrates a high level block diagram of an illustrative general purpose computer suitable for use in performing the functions described herein. The general purpose computer 400 may be a part of the wireless device 104 or the accessory device 106. As depicted in FIG. 4, the general purpose computer 400 comprises a processor element 402 (e.g., a CPU), a memory 404, e.g., random access memory (RAM) and/or read only memory (ROM), a module 405 for extending an authentication of a wireless device, and various input/output devices 406 (e.g., storage devices, including but not limited to, a tape drive, a floppy drive, a hard disk drive or a compact disk drive, a receiver, a transmitter, an antenna, a speaker, a display, a speech synthesizer, an output port, and a user input device (such as a keyboard, a keypad, a mouse, a button and the like)).

It should be noted that the present invention can be implemented in software and/or in a combination of software and hardware, e.g., using application specific integrated circuits (ASIC), a general purpose computer or any other hardware equivalents. In one embodiment, the processes provided by the present module 405 for extending an authentication of a wireless device can be loaded into memory 404 and executed by processor 402 to implement the functions as discussed above. As such, the processes provided by the module 405 for extending an authentication of a wireless device of the present invention can be stored on a computer readable medium or carrier, e.g., RAM memory, magnetic or optical drive or diskette and the like.

Figure 5:
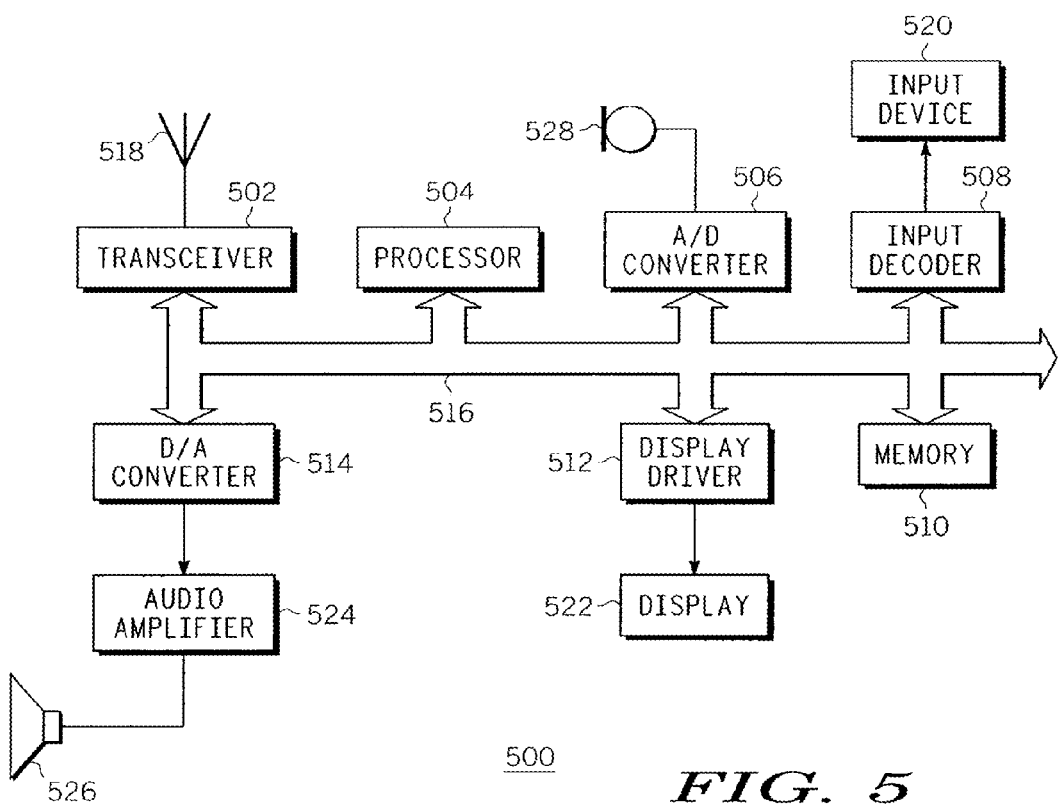
FIG. 5 illustrates a more detailed block diagram of the general purpose computer suitable for use in performing the functions described herein.

FIG. 5 illustrates an apparatus 500 which may represent a more detailed block diagram of the general purpose computer 400 which may be part of the wireless device 104 or the accessory device 106. In one embodiment, the apparatus 500 may be a wireless device 104 such as a cellular telephone which comprises a transceiver 502, a processor 504, an analog to digital converter (A/D) 506, an input decoder 508, a memory 510, a display driver 512, and a digital to analog converter (D/A) 514, which may all coupled together through a digital signal bus 516. The transceiver module 502 may be coupled to the antenna 518. Carrier signals that are modulated by data may pass between the antenna 518 and the transceiver 502. The antenna/transceiver pair may comprise a plurality of antenna/transceiver pairs such that one pair is designed to receive and transmit signals to/from a cellular tower, while another pair is designed to communicate via short range wireless protocol with a connected accessory device 106.

The input device 520 may be coupled to the input decoder 508. The input decoder 508 serves to identify depressed keys, for example, and provide information identifying each depressed key to the processor 504. The display driver 512 may be coupled to a display 522.

The D/A 514 may be coupled through an audio amplifier 524 to a speaker 526. The D/A 514 may convert decoded digital audio to analog signals and drives the speaker 526. The audio amplifier 524 may comprise a plurality of amplifiers with each driving a separate speaker.

The A/D 506 may be coupled to a microphone 528. The A/D 506 converts analog signals from the microphone into digital audio signals which may be wirelessly transmitted.

The memory 510 may also be used to store programs that control aspects of the operation of the cellular telephone including software algorithms for implementing the invention described in this application. The memory 510 may be a form of a computer readable medium.

Additionally, FIG. 5 may also represent an accessory device 106. In general, the accessory device 106 may include less functionality than the wireless device 104. For example, rather than including a plurality of transceiver/antenna pairs as described with reference to the wireless device 104, the transceiver 502 and antenna 518 of the accessory device 106 may only be designed to communicate via short range wireless communication. Additionally, accessory devices 106 may remove one or more components based on the required functionality. For example, a watch accessory device 106 may not include an A/D converter 506 and microphone 528. A headset, on the other hand may not include a display driver 512 or display 522. One skilled in the art will realize that while certain components such as a transceiver 502, antenna 518, processor 504, memory 510, and digital signal bus 516 may generally be required of all accessory devices 106, various different accessories implementing the invention described in this application could be built with different combinations of the remaining components shown or not shown in FIG. 5.

While the foregoing is directed to illustrative embodiments of the present invention, other and further embodiments of the invention may be devised without departing from the basic scope thereof, and the scope thereof is determined by the claims that follow.

What is claimed is:

1. A method for controlling access to a function performed by a wireless device, comprising:
   receiving, by the wireless device, an authentication;
   detecting, by the wireless device, an accessory device coupled to the wireless device;
   operating, at the wireless device and in response to detection of the accessory device, in an enhanced security mode in which a user of the wireless device is not required to provide the authentication to obtain access to the function performed by the wireless device while the wireless device is operating in the enhanced security mode; and
   permitting performance of the function by the wireless device while the accessory device is detected and while the wireless device is operating in the enhanced security mode, wherein the operating in the enhanced security mode comprises extending an amount of time of access to the function so that the amount of time of access permitted in the enhanced security mode is greater than an amount of time of access permitted while the wireless device is in a mode different from the enhanced security mode.

2. The method of claim 1, wherein the operating in the enhanced security mode for the wireless device is in response to the accessory device being a bonded authentication device.

3. The method of claim 1, wherein the operating in the enhanced security mode comprises providing access to previously locked or disabled functions of the wireless device while the wireless device is operating in the enhanced security mode.

4. The method of claim 1, wherein the mode different from the enhanced security mode comprises an unauthenticated mode or a user authenticated mode.

5. A non-transitory computer-readable medium having stored thereon a plurality of instructions, the plurality of instructions including instructions which, when executed by a processor, cause the processor to perform a method for controlling access to a function performed by a wireless device, comprising:
   receiving, by the wireless device, an authentication;
   detecting, by the wireless device, an accessory device coupled to the wireless device;
   operating, at the wireless device an in response to detection of the accessory device, in an enhanced security mode in which a user of the wireless device is not required to provide the authentication to obtain access to the function performed by the wireless device while the wireless device is operating in the enhanced security mode; and
   permitting performance of the function by the wireless device while the accessory device is detected while and the wireless device is operating in the enhanced security mode, wherein the operating in the enhanced security mode comprises extending an amount of time of access to the function so that the amount of time of access permitted in the enhanced security mode is greater than an amount of time of access permitted while the wireless device is in a mode different from the enhanced security mode.

6. The computer-readable medium of claim 5, wherein the operating in the enhanced security mode for the wireless device is in response to the accessory device being a bonded authentication device.

7. The computer-readable medium of claim 5, wherein the operating in the enhanced security mode comprises providing access to previously locked or disabled functions of the wireless device while the wireless device is operating in the enhanced security mode.

8. The computer-readable medium of claim 5, wherein the mode different from the enhanced security mode comprises an unauthenticated mode or a user authenticated mode.

9. A wireless device comprising a processor operable to:
receive an authentication;
detect an accessory device;
operate in an enhanced security mode, in response to detection of the accessory device, in which a user of the wireless device is not required to provide the authentication to obtain access to a function performed by the wireless device while the wireless device is operating in the enhanced security mode; and
permit performance of the function by the wireless device while the accessory device is detected and while the wireless device is operating in the enhanced security mode, wherein the processor is operable to operate in the enhanced security mode by extending an amount of time of access to the function so that the amount of time of access permitted in the enhanced security mode is greater than an amount of time of access permitted while the wireless device is in a mode different from the enhanced security mode.

10. The wireless device of claim 9, wherein the processor is operable to operate in the enhanced security mode in response to the accessory device being a bonded authentication device.

11. The wireless device of claim 9, wherein the processor is operable to operate in the enhanced security mode by providing access to previously locked or disabled functions of the wireless device while the wireless device is operating in the enhanced security mode.

12. The wireless device of claim 9, wherein the mode different from the enhanced security mode comprises an unauthenticated mode or a user authenticated mode.

13. The method of claim 1, further comprising ceasing the operating in the enhanced security mode in response to a lack of detection of the accessory device.

14. The method of claim 1, wherein the extending the amount of time of access to the function comprises extending a duration of time between times at which the authentication must be received by the wireless device.

15. The computer-readable medium of claim 5, wherein the method for controlling access to the function performed by the wireless device further comprises ceasing the operating in the enhanced security mode in response to a lack of detection of the accessory device.

16. The computer-readable medium of claim 5, wherein the extending the amount of time of access to the functions comprises extending a duration of time between times at which the authentication must be received by the wireless device.

17. The wireless device of claim 9, wherein the processor is further operable to cease to operate in the enhanced security mode in response to a lack of detection of the accessory device.

18. The wireless device of claim 9, wherein the extending the amount of time of access to the function comprises extending a duration of time between times at which the authentication must be received by the wireless device.

* * * * *